United States Patent [19]

Hahn et al.

[11] 3,950,592
[45] Apr. 13, 1976

[54] METHOD OF COATING A METAL SUBSTRATE AND THE COATED SUBSTRATE

[75] Inventors: Ernest A. Hahn, Plainfield, Ill.; Robert J. Sirkoch, Pittsburgh, Pa.

[73] Assignee: PPG Industries, Inc., Pittsburgh, Pa.

[22] Filed: Sept. 14, 1973

[21] Appl. No.: 397,536

Related U.S. Application Data

[62] Division of Ser. No. 213,184, Dec. 28, 1971, abandoned.

[52] U.S. Cl. .................. 428/463; 260/884; 427/44
[51] Int. Cl. ............................................. B44d 1/50
[58] Field of Search .............. 117/93.31, 75, 132 C

[56] References Cited
UNITED STATES PATENTS

| | | | |
|---|---|---|---|
| 2,384,119 | 9/1945 | Muskat et al. | 260/475 N |
| 2,956,902 | 10/1960 | Greif | 117/75 |
| 3,069,291 | 12/1962 | Levine et al. | 117/75 |
| 3,247,289 | 4/1966 | Sears | 260/884 |
| 3,269,862 | 8/1966 | Lanza et al. | 117/93.31 X |
| 3,336,418 | 8/1967 | Dill | 260/884 |
| 3,436,325 | 4/1969 | Aufhauser | 117/93.31 X |
| 3,480,462 | 11/1969 | Shanok et al. | 117/75 X |
| 3,528,844 | 9/1970 | Burlant et al. | 117/93.31 |
| 3,557,256 | 1/1971 | Muskat | 260/884 |
| 3,785,849 | 1/1974 | Parker et al. | 117/93.31 |

*Primary Examiner*—Ralph Husack
*Attorney, Agent, or Firm*—George D. Morris

[57] ABSTRACT

A composition comprising a vinyl resin and a mixture of acrylic compounds each having the formula:

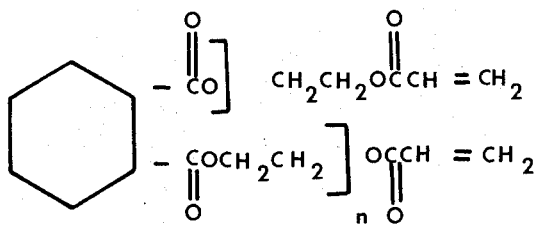

wherein $n$ is from 0 to 10, or a mixture of acrylic compounds each having the formula:

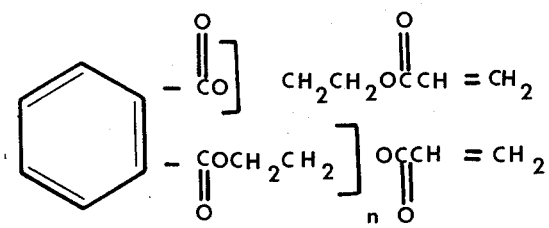

wherein $n$ is from 0 to 10, may be coated on to a metal substrate and subjected to ionizing irradiation and used as a primer coating for numerous radiation-sensitive topcoats.

6 Claims, No Drawings

METHOD OF COATING A METAL SUBSTRATE AND THE COATED SUBSTRATE

This is a division of application Ser. No. 213,184, filed Dec. 28, 1971, now abandoned.

Radiation-curable materials in the future will be used extensively as topcoats for metal substrates particularly in the coil coating industry. A major problem involved with the topcoating of metal substrates with radiation-curable topcoats is that the adhesion between the two materials is very poor and primer coatings must be used to bond the above topcoats to the metal. The conventional primers used to achieve the better adhesion however, generally do not enhance other necessary properties such as corrosion resistance.

A novel primer has now been found which gives excellent adhesion to metal surfaces and excellent inner coat adhesion with radiation-cured topcoats and which exhibits excellent corrosion resistance.

This primer has the advantage of being the only radiation-curable material which offers acceptable adhesion to metal surfaces. Thus, the operation of priming the metal and topcoating with a radiation-curable topcoat may now be carried out in the same equipment. That is, the use of a baking oven to cure the primer is now not necessary as the same radiation unit that is used to cure the topcoating may be used to cure the primer.

The novel primer compositions of this invention are radiation-sensitive and comprise a mixture of (1) a vinyl resin, and (2) a mixture of acrylic compounds wherein each compound has the formula:

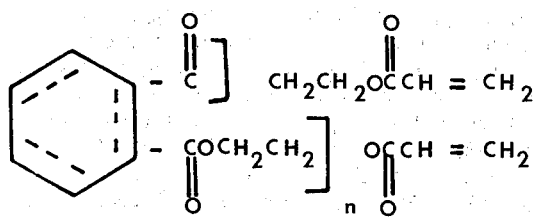

wherein $n$ is from 0 to 10 and wherein the six member ring may be aliphatic or aromatic. The vinyl resins which are combined with the acrylic compounds to form the compositions of this invention are preferably copolymers of a vinyl halide such as vinyl chloride or vinyl bromide with a vinyl ester of an aliphatic monocarboxylic acid such as vinyl acetate, vinyl propionate, vinyl butyrate, or the like. Vinyl acetate is the preferred ester.

The vinyl halide is preferably the predominant component of the vinyl resin ordinarily being present in an amount of about 50 percent to about 95 percent by weight while the ester of an aliphatic monocarboxylic acid is ordinarily present in an amount of about 2 percent to about 45 percent by weight. The resin may also contain a minor proportion (0 to 3 percent) of carboxyl or hydroxyl component. One particularly desirable vinyl resin for use in the present invention contains approximately 83 percent vinyl chloride, approximately 16 percent vinyl acetate, and approximately 1 percent carboxyl component, normally maleic acid. The above vinyl resins are readily available as commmercial products as are other vinyl halidevinyl ester copolymers.

In addition to copolymers, homopolymers of vinyl halides, such as polyvinyl chloride or polyvinyl bromide may also be used as the vinyl resin and are to be included within the scope of the term "vinyl resin" as utilized herein.

A mixture of acrylic compounds having the formula:

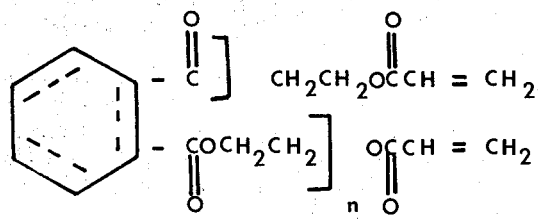

wherein $n$ has values of from 0 to 10 and wherein the six membered ring may be aliphatic or aromatic is mixed with the vinyl resin. The method of preparing these mixtures of acrylic compounds is disclosed in copending U.S. Patent applications Ser. No. 841,152, filed July 11, 1969, now abandoned, Ser. No. 98,130, filed Dec. 14, 1970, now abandoned, and Ser. No. 98,152, filed Dec. 14, 1970, now abandoned. The mixture in either case generally comprises from about 1 percent to about 20 percent by weight of the compound where $n = 1$, from about 5 percent to about 12 percent by weight of the compound where $n = 0$, from about 15 percent to about 25 percent by weight of the compound where $n = 2$, and from about 15 percent to about 25 percent by weight of the compound where $n = 3$, and from about 40 percent to about 55 percent by weight of the compounds where $n = 4$ to 10. There may be trace amounts of compounds present where $n$ is greater than 10.

For most purposes, it is desirable to add corrosion-resistant pigments to the primer composition. The corrosion-resistant pigments are preferably metal chromate pigments. Examples of these pigments having the desired corrosion-resistant properties are zinc chromate, strontium chromate, and calcium chromate. The preferred pigment is strontium chromate.

Usually the pigment is ground in a portion of the acrylic to make a paste and this is blended with the mixture of vinyl resin and acrylic compounds to produce the primer composition.

The primer composition may be formed by adding and dissolving the vinyl resin in the acrylic compounds. The ground pigment paste is then added to the mixture of vinyl resin and acrylic compounds and the primer composition is agitated to enhance the mixing of the components.

The mixture of vinyl resin and acrylic compounds should generally comprise from about 30 percent by weight to about 96 percent by weight of the vinyl resin and from about 4 percent by weight to about 70 percent by weight of the acrylic compounds. It has been found that mixtures containing less than about 30 percent by weight of vinyl resin do not have the adhesive proprties required of the primer composition and that mixtures containing less than about 4 percent by weight of the acrylic compounds do not exhibit the excellent corrosion resistance of the primers of this invention.

It has been found that in most instances desirable primers are obtained using pigmented compositions containing ratios of pigments to vinyl resin-acrylic mixture of about 1 to 1 and preferably not higher than about 4 to 1. Excessively high pigment to vinyl resin-acrylic mixture ratios may result in poor flow characteristics of the primer composition.

In many instances it may be desirable to add acrylic monomers to lower the viscosity of the mixture for application purposes. Suitable acrylic monomers include alkyl esters of acrylic or methacrylic acid such as butyl acrylate, butyl methacrylate, octyl acrylate, and the like.

It may also be desirable to add acrylic polymers such as polymers and interpolymers of alkyl esters of acrylic and methacrylic acid to the composition to increase the adhesion and flexibility of the coating. A particularly useful acrylic polymer is a copolymer of methyl methacrylate and ethyl acrylate.

The coating compositions formed may also include various reactive solvents, plasticizers, fillers, other pigments, and the like. These compositions are primarily employed as primers for metal substrates and ratiation-curable topcoats in the automotive field.

The composition may be coated onto a substrate by any conventional method such as roll coating, dip coating, curtain coating, or spraying. The substrates which may be primed by the coating compositions of this invention include metals such as aluminum, steel, and the like.

The preferred methods of applying the novel primers of this invention are by thinning the composition with suitable solvents such as butyl acrylate, ethyl acrylate, 2-ethylhexyl acrylate and the like, and applying as a solution at room temperature or by heating the composition to above its melting point at between 200°F. and 290°F. and applying it as a hot melt composition to the substrate.

If the primer is to be applied as a solution, the percent solids may be from about 10 percent to about 70 percent. When a solution primer is used, the acrylic compounds will generally be about 4 to about 10 percent by weight of the vinyl resin acrylic mixture. When the primer is applied as a hot melt composition, the ratio of acrylic compounds to vinyl resin is generally higher.

The primed metal substrate is then subjected to ionizing irradiation to adhere the primer to the metal and to insure proper compatability to the radiation-curable topcoat.

The term "irradiation", as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other typs of radiation, such as gamma and X-rays, energy systems equivalent to the above range of electron volts are desirable.

It is intended that the term irradiation include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation".

The term ionizing particle radiation has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

Ionizing electromagnetic irradiation is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Patent No. 762,953 are satisfactory for the practice of this invention.

The primer compositions may be irradiated either in air or in an inert gaseous atmosphere such as nitrogen. If the primer is treated in air, a total dosage of from about 1.5 megarads to about 6 megarads will be necessary to achieve satisfactory adhesion with the metal base and cmpatability with the topcoat and if the primer composition is treated in an inert gaseous atmosphere such as nitrogen the required dosage is from about 0.1 megarad to about 1.5 megarads. A "rad" is defined as that amount of radiation required to supply 100 ergs per gram of material being treated and a "megarad" is $10^6$ rads. The total dosage is the total amount of irradiation received by the primer prior to the topcoating with the radiation-curable material. It has been found that the primers treated with less than the total dosage described above are too soft and hard to handle with respect to topcoating the material, as the topcoat will have poor flow characteristics on the primer. Also, the primer will not adhere well to the metal base. If the total dosage is greater than the total dosage described above (6 megarads in air and 1.5 megarads in nitrogen), the primer will not be compatible with the topcoat and thus would not adhere well to the topcoat.

The topcoat material may be applied to the irradiated primer by any method. The topcoat is then subjected to ionizing irradiation to cure the topcoat.

The topcoat material may be any radiation-sensitive topcoat material such as acrylics, diacrylates, and tri- and tetra-acrylates, di-, tri- and tetra-methacrylates, acrylic syrups, and the like. Essentially any radiation-curable topcoat material may be adhered to metal substrates using the primer of this invention. It is also pointed out that many conventional topcoating materials may also be adhered to metal substrates in a like manner.

The primed metal and topcoat are subjected to a total dosage of from about 0.2 megarad to about 20 megarads to cure the topcoat. The resulting coated metal has excellent strength and corrosion resistance and is especially useful in the fields of automotive finishings and industrial coatings.

The invention will be described further in conjunction with several exampls showing the method and practice of the invention. These examples, however, are not to be construed as limiting the invention to their details. All parts and percentages are by weight and are based upon non-volatile solids contents unless otherwise indicated.

EXAMPLE 1

A primer composition was prepared according to the following method.

A vessel was charged with 74.62 parts of strontium chromate pigment, 14.89 parts of titanium dioxide pigment, 254.44 parts of a 30 percent solution of a vinyl chloridevinyl acetate maleic anhydride copolymer (VMCC) in butyl acrylate, and 254.44 parts of a 30 percent solution of a copolymer of 70 percent methyl methacrylate and 30 percent ethyl acrylate (Acryloid B-44) in butyl acrylate. The pigment paste was ground and 35.13 parts of the 30 percent solution of Acryloid B-44 were added. The mixture was blended and to the mixture were added 44.58 parts of a mixture of acrylic compounds having the formula:

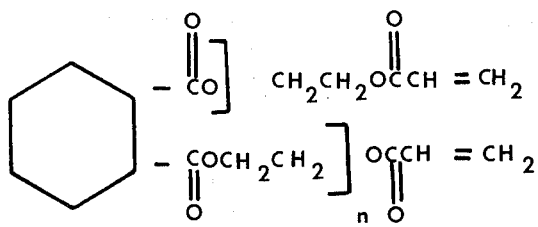

wherein $n$ equals 0 to 10 (bisacryloxy(hexahydrophthalate) 89.15 parts of a 30 percent solution of Acryloid B-44, and 124.28 parts of the 30 percent solution of VMCC.

The above composition was coated onto a galvanized steel panel at a coating thickness of 0.2 to 0.3 mils and the primed steel was cured by subjecting to electron beam bombardment to a total dosage of one megarad in a nitrogen atmosphere. A top coating of bisacryloxy(hexahydrophthalate) having a coating thickness of 0.7 to 0.8 mil was coated on the primer and cured by subjecting to electron beam bombardment to a total dosage of 3 megarads in a nitrogen atmosphere. The primed system had a pencil hardness of 2H, excellent salt spray resistance (250 hours tested with very little undercutting), good flexibility (reverse impact of less than 10 inch pounds), and excellent adhesion (a T bend of 3T).

EXAMPLE 2

A primed metal is prepared according to the following method.

A primer composition similar to that of Example 1 except that a mixture of acrylic compounds having the formula

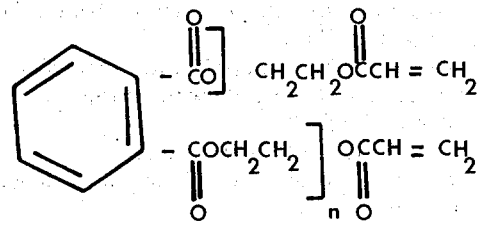

wherein $n$ equals 0 to 10 (bisacryloxy(phthalate) is substituted for the cycloaliphatic mixture. A coating is drawn down on galvanized steel and cured by ionizing irradiation at 4 megarads in a nitrogen atmosphere. A top coating of bisacryloxy(phthalate) is then applied and subjected to ionizing irradiation at a total dosage of 4 megarads in nitrogen. The resulting primed system has excellent adhesion flexibility and salt spray resistance.

According to the provisions of the patent statutes, there is described above the invention and what are now considered to be its best embodiments. However, within the scope of the appended claims, it is to be understood that the invention can be practiced otherwise than as specifically described.

We claim:
1. A coated substrate comprising:
   a. a metal base;
   b. a layer of a primer composition comprising
      1. from about 4 percent to about 70 percent by weight of a mixture of acrylic compounds wherein
         a. each of said acrylic compounds has the formula

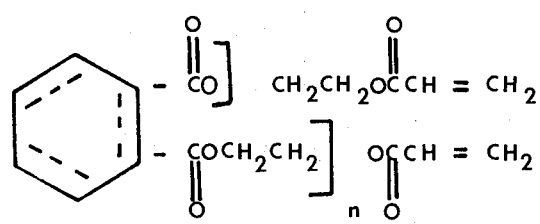

wherein $n$ is from 0 to 10 and the six member ring is aliphatic or aromatic,
      b. said mixture contains said acrylic compounds having said formula wherein $n$ is 0, 1, 2, 3, 4, 5, 6, 7, 8, 9 and 10,
   2. from about 30 percent to about 96 percent by weight of a copolymer of
      a. from about 50 percent to about 95 percent by weight of a vinyl halide, and b. from about 2 percent to about 45 percent by weight of a vinyl ester of an aliphatic monocarboxylic acid, which layer has been adhered to said metal substrate and rendered compatible to a radiation curable coating material by exposure to ionizing irradiation; and c. a topcoating of a radiation curable material which is adjacent to said layer of said irradiated primer composition and which has been cured by exposure to ionizing irradiation.

2. The coated substrate of claim 1 wherein the six member ring is aliphatic.

3. A method of coating a substrate comprising
a. coating a metal substrate with a primer composition comprising
1. from about 4 percent to about 70 percent by weight of a mixture of acrylic compounds wherein
a. each of said acrylic compounds has the formula

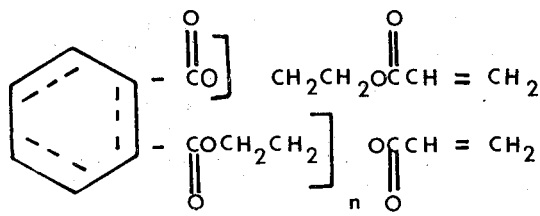

wherein $n$ is from 0 to 10 and the six member ring is aliphatic or aromatic, b. said mixture contains said acrylic compounds having said formula $n$ is 0, 1, 2, 3, 4, 5, 6, 7, 8, 9 and 10, 2. from about 30 percent to about 96 percent by weight of a copolymer of
a. from about 50 percent to about 95 percent by weight of a vinyl halide, and
b. from about 2 percent to about 45 percent by weight of a vinyl ester of an aliphatic monocarboxylic acid, b. subjecting said coated metal substrate to ionizing irradiation to adhere said primer composition to said metal substrate and to provide compatibility to a radiation curable coating material;

c. applying to said irradiated primer composition a topcoating of a radiation curable material; and d. subjecting said coated metal substrate to ionizing irradiation to cure said topcoated radiation curable material.

4. The method of claim 3 wherein the primer layer is subjected to a total dosage of from about 0.1 megarad to about 6 megarads prior to the topcoating and the base, primer coat, and topcoat are subjected to a total dosage of from about 0.2 megarad to about 20 megarads.

5. The method of claim 3 wherein the primer composition is applied to the metal substrate by heating said primer composition to a temperature of from about 200°F. to about 290°F. so that the composition is melted and applying said heated composition to the metal substrate and cooling until the primer composition is no longer flowable.

6. The method of claim 3 wherein the primer composition is applied to the metal substrate by reducing the composition to about 25 percent solids with a solvent for said composition and subsequently driving off said solvent.

* * * * *

UNITED STATES PATENT OFFICE
CERTIFICATE OF CORRECTION

PATENT NO. : 3,950,592
DATED : April 13, 1976
INVENTOR(S) : Ernest A. Hahn et al It is certified that error appears in the above-identified patent and that said Letters Patent are hereby corrected as shown below:

Column 8, line 2, insert --wherein-- before "n".

Signed and Sealed this twenty-ninth Day of June 1976

[SEAL]

Attest:

RUTH C. MASON
Attesting Officer

C. MARSHALL DANN
Commissioner of Patents and Trademarks